Nov. 28, 1944.    J. F. RUDE    2,363,749
TRACTOR-DRAWN LIFTABLE PLANTER
Filed Jan. 19, 1942    2 Sheets-Sheet 1
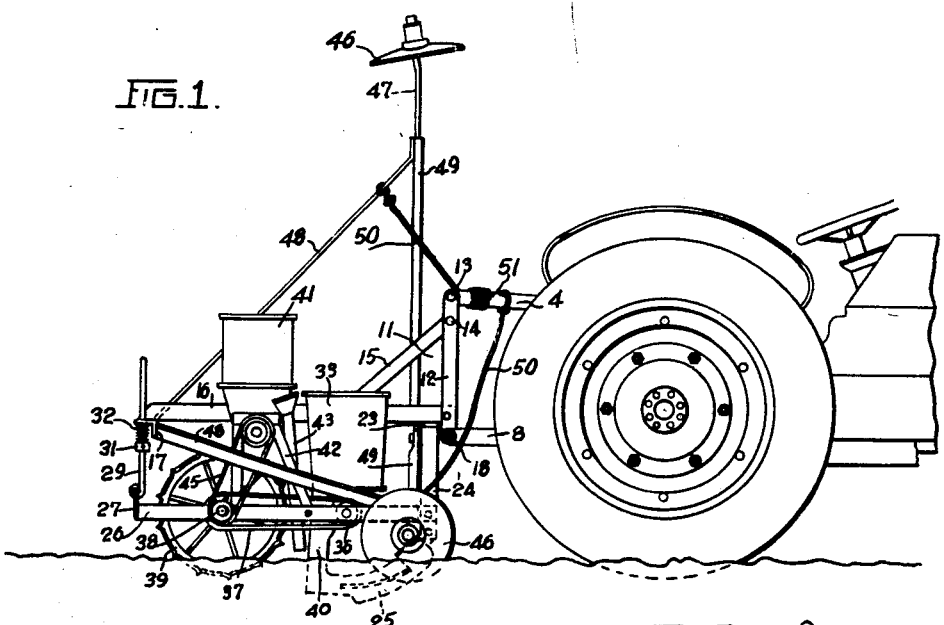
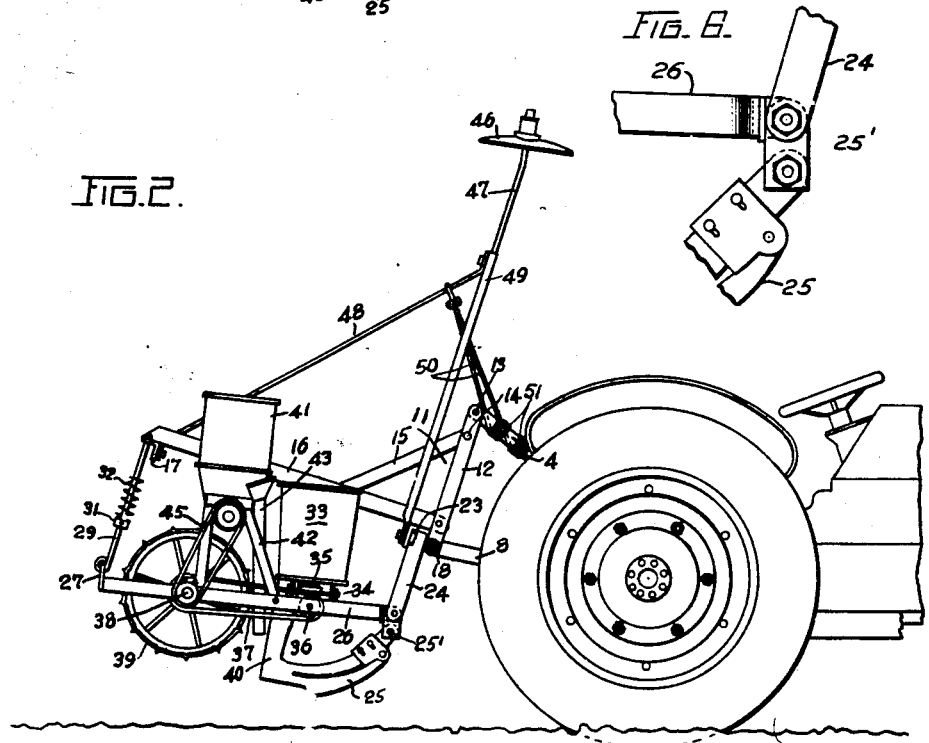
JOHN F. RUDE,

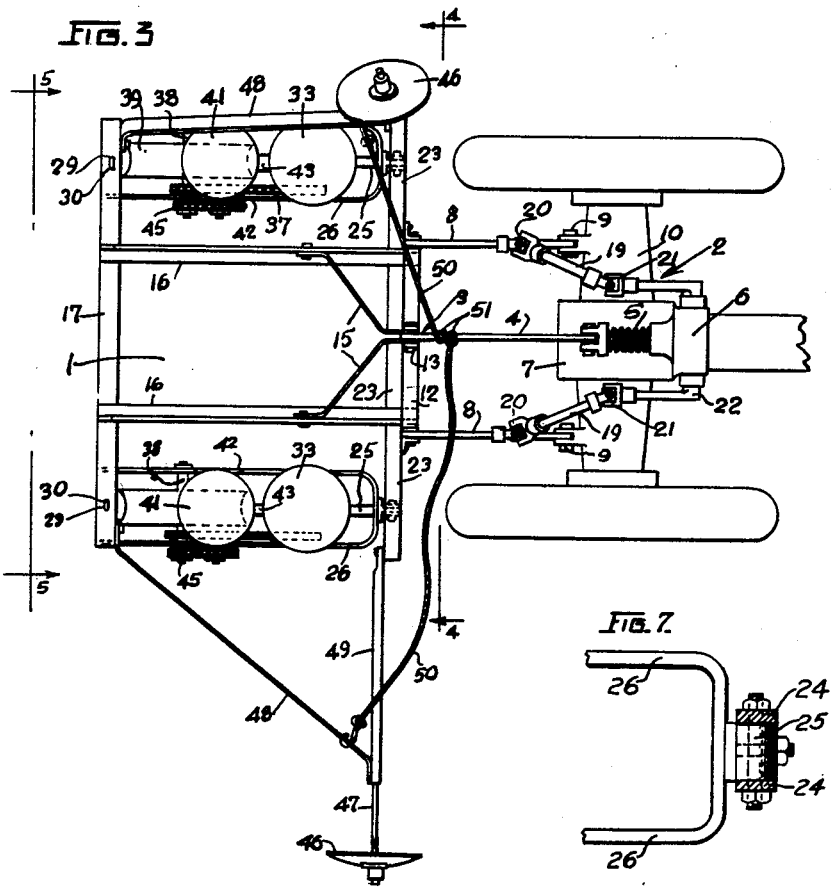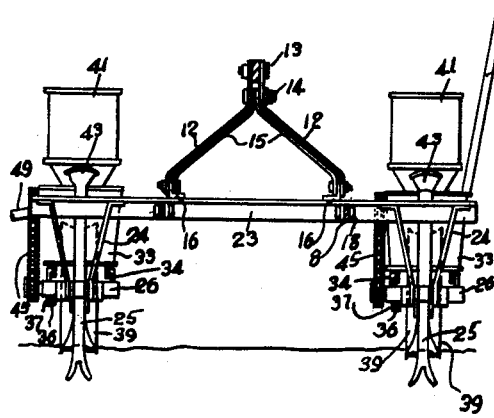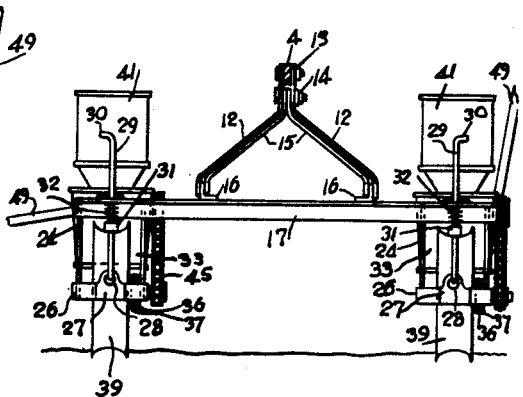

Patented Nov. 28, 1944

2,363,749

UNITED STATES PATENT OFFICE 2,363,749

TRACTOR-DRAWN LIFTABLE PLANTER

John F. Rude, Evansville, Ind., assignor to Blount Plow Works, Evansville, Ind., a corporation of Indiana Application January 19, 1942, Serial No. 427,300

3 Claims. (Cl. 111—59)

The present invention relates to farm implements, and more particularly to corn-planting machines.

In corn planters it is customary to arrange the corn and fertilizer hoppers in such a manner that two rows of corn may be planted and fertilized simultaneously during a single run of the planter down the field. The planter is usually drawn by a tractor, or other suitable source of motive power. The corn hopper precedes the fertilizer hopper and directly below the corn hopper, a little in front thereof, a plow or shoe is provided for forming a groove in the soil into which the corn is deposited and thereafter covered with fertilizer. The plowed groove is automatically filled and covered with soil by a suitably shaped ground wheel, which is positioned at the rear of the planter, this wheel also serving to carry the weight of the planting and fertilizing mechanism. The corn and fertilizer hoppers, also the shoes and ground wheels are mounted on a structural iron framework which extends entirely across the planter. This framework prior to the present invention was of a rigid, self-supporting construction.

While this rigid frame type of planter gives satisfactory results in case the ground is level, it has been found that when the ground is hilly, bumpy or when the planter is being drawn over sloping ground in which the degree of slope changes from time to time, there is a tendency for one of the plows or shoes to enter the ground to a depth greater than the predetermined depth, or for the other shoe to enter the ground less than the predetermined amount, and in case the variations in slope are abrupt the other plow may not even contact the ground. Consequently, the depth to which the corn is planted in the two rows may vary considerably and thus deleteriously affect the yield.

The primary object of my invention is to provide an improved corn planter, in which the frame that carries the two pairs of corn and fertilizer hoppers is of an articulated character and is so arranged that each part of the frame carrying its own planting and fertilizing unit will automatically take such a position as will permit the plow and ground wheel to conform to the immediate level and shape of the ground. This object is carried out, in brief, by supporting all of the mechanism of each planting unit, including the corn and fertilizer hoppers of that unit, on an auxiliary frame which is permitted to swing with respect to the main frame of the planter.

Another object of the invention is to provide a corn planter of inexpensive but effective construction, of relatively light weight, and an apparatus which may be readily assembled from simple parts.

Certain types of corn planters are connected to a tractor, or other source of motive power, through a hitch which is so arranged that the operator of the tractor can elevate the planting and fertilizing mechanism by a simple movement of a lever. However, the arrangement has been such that the frame on which the planting mechanism is mounted was drawn immediately upward as soon as the lever was actuated, because all of the mechanical connections were of a non-resilient, non-yieldable character. However, in accordance with the present invention an improved form of support for the planting and fertilizing mechanism is provided, in which a high degree of flexibility is obtained between the operating lever and the frame on which the planting devices are mounted.

This object is attained, in brief, by dividing the planter framework into two portions which are joined only through a yieldable connection, mounting the planting mechanism on the yielding support member and connecting the other frame portion directly to the actuating lever. Thus when the latter is operated only the rigid portion of the planter frame will immediately respond, and thereafter the rest of the frame which carries the planting mechanism will move upwardly to withdraw the plow or shoe from the ground and to elevate the ground wheel. It is apparent that by this improved mechanism or arrangement there is less likelihood of fracturing any part of the planter framework when, for example, the plow has become wedged under a heavy root and opposes movement in the upward direction, because in this case the plow cannot be immediately removed from the soil upon actuation of the lever. In other words, the withdrawal of the plow or shoe from the soil would take place in a gradual manner and at such a rate as not to introduce undue stresses in the frame.

The invention will be better understood when the following specification is read in connection with the accompanying drawings.

In the drawings:

Figure 1 is a side elevational view of the improved planter and a portion of the tractor. This figure shows the machine in the act of planting corn.

Figure 2 is a view similar to Figure 1 except that the planter is shown in its tilted position after the plow and the ground wheel have been moved upwardly from their respective operative positions.

Figure 3 is a plan view of the machine shown in Figure 1, including the planter hoisting mechanism and the rear portion of the tractor.

Figure 4 is a front elevational view of the planter per se, this view being taken at approximately the position indicated by the line 4—4 in Figure 3 and looking in the direction of the arrows.

Figure 5 is a rear elevational view of the planter per se taken at about the position of the line 5—5 in Figure 3.

Figure 6 is a fragmentary side elevational view disclosing in detail the universal joint in which the fertilizer and seed hoppers, and the plough are swivelly connected to the main frame.

Figure 7 is a fragmentary top plan sectional view of the details shown in Figure 6.

The planter, which is generally designated by the reference numeral 1, is carried on a rectangularly shaped main frame and is drawn by a suitable source of motive power, generally indicated by the reference numeral 2 and which may comprise a tractor of any suitable and well known type. There is a hitch frame, generally indicated at 3, interconnecting the rear portion of the tractor with the main frame of the planter, this hitch consisting esssentially of a centrally disposed compression bar 4 which is connected through a compression spring 5 to a suitable position, indicated at 6, on the tractor differential housing 7. The tension counterparts of the hitch may comprise a pair of bars 8 which terminate at their right-hand ends in swivel joints 8 secured to a heavy casing 10 which surrounds the rear axle of the tractor and is connected to the differential housing 7. The purpose of these swivel joints will be explained hereinafter.

The left-hand ends of the tension and compression bars terminate in a tripod arrangement, generally indicated at 11, which is connected to the main frame of the planter. The tripod 11 may include vertically extending arms 12 which extend outwardly at the bottom, as shown in Figures 4 and 5, to constitute a rectangular configuration. The upper ends of the arms 12 are provided with a swivel bolt 13 which threads through an opening in the compression bar 4 so that the latter is adapted to swing freely between the parallel portions of the arms 12. Immediately below the swivel joint 13 the arms 12 are provided with a non-swivel bolt 14, from which extends a pair of arms 15, the latter being directed diagonally both in the vertical and horizontal planes, as can be seen by comparing Figures 3 and 4, thus conforming to a triangular shape. The lower ends of the arms 12 and 15 are rigidly secured to a pair of longitudinally extending angle irons 16 which are riveted or welded at the rearmost end of the planter to a transversely extending angle iron 17. The left-hand ends (Figure 3) of the tension bars 8 are swivelly connected, as indicated at 18, to the lower portions of the arms 12 which are extended downwardly beyond the longitudinal angle irons 16.

The frame which has been described up to this point constitutes the main support of the planter, and all the joints are rigidly made except the joints between the compression bar 4 and the arms 12, and between the tension bars 8 and the arms 12. This frame is adapted to be tilted upwardly, as shown in Figure 2, by means of suitable mechanism which in Figure 3 has been exemplified by connecting rods 19 which are connected through universal joints 20 with the tension bars 8, and at the other end are connected through universal joints 21 to a crank 22 suitably journaled in the tractor housing. By means of a lever (not shown) the crank 22 may be rotated, for example clockwise as seen in Figure 2, causing an upward pull to be exerted through the connecting rods 19 on the tension bars 8. This upward movement of the bars 8 causes the frame members 16, 17, which are carried by the tripod 11, to swing upwardly and thus to elevate any apparatus carried on the main frame. The purpose of this elevating movement will be explained hereinafter.

The corn and fertilizer hoppers of each planting unit are directly mounted on auxiliary frames which are independently swingable or tiltable with respect to the main frame. Each auxiliary frame is suspended below the main frame and is carried at one end by a transversely extending angle iron 23 which is secured to the under side of the longitunally extending angle iron 16. A pair of U-shaped bars 24 is dropped from the ends of the transverse angle iron 23. The lower ends of the bars 24 (see Figures 2, 6 and 7) support the right-hand end of a conventional shoe or plow 25, and immediately above the plow and swivelly connected to each bar 24, as indicated at 25', there is a swingable U-shaped auxiliary frame member 26. It will be understood that there are as many frame members as planter units and two in the apparatus illustrated. The U-shaped frame members 26 may be formed of heavy bar material, and at their rearmost ends there is provided a plate 27 having a central opening 28 for receiving a hooked rod 29. This rod extends upwardly (see Figures 1 and 2) and threads through an opening provided at each end of the rear angle iron 17. The upper end of each rod 29 terminates preferably in an angular portion indicated at 30, the purpose of which is to prevent the rod from becoming disengaged from the angle iron 17. The rod is provided with a keyed collar 31, and there is a compression spring 32 resting on the collar. The purpose of the rods 29 will be understood from a comparison of Figures 1 and 2.

When the plow 25 is inserted into the ground, which condition is shown in Figure 1, the main frame elements 16, 17 rest directly upon the springs 32, and should the plow meet with an obstruction tending to lift the plow out of the ground, due to its tapered front edge, the left-hand end of each auxiliary frame 26 is permitted to move upwardly a predetermined distance against the action of the spring 32 and without disturbing the main frame 16, 17. When the main frame is elevated into the position shown in Figure 2 by the lever (not shown) at the driver's seat, and operating through the linkage 22, 19, 8 and the tripod 11 as explained hereinbefore, the main frame 16 will respond immediately to the elevating movement, but the auxiliary frames 26 will not respond until the hook 30 will have contacted the angle iron 17 of the main frame member. The last-mentioned condition is shown in Figure 2, and it is apparent that a predetermined time delay is introduced between the elevation of the main frame and the upward movement of the auxiliary frames 26 when the actuating lever is operated. No strain therefore can be introduced throughout the various frames during the tilting operation, regardless of the speed with which the tilting lever is actuated. But the auxiliary frames which carry the planted units are effectively elevated from the ground as the result of the lever operation.

Each corn hopper 33 is suitably mounted on short uprights 34 which extend from opposite sides of the U-shaped member 26. These hoppers contain the usual form of seed-feeding mechanism which is actuated by a bevel gear 35 extending through the bottom of the hopper (Figure 2). This gear meshes with a corresponding gear which forms part of a sprocket 36, journaled in one of the legs of the U-shaped frame 26. A chain 37 engages the sprocket 36, and this chain meshes with a sprocket journaled at 38 in the same leg of the frame 26 as the sprocket 36. A shaft extends between the legs of the auxiliary frame 26 and is also journaled at 38, this shaft carrying a cleated ground wheel 39 of any suitable and well known shape. As shown, the wheel is given a concave circumferential surface, the purpose of which is to cover the groove made in the soil by the plow or shoe 25. The ground wheel 39 is positioned preferably midway of the legs of the auxiliary frame 26.

There is a corn chute 40 communicating with the feed opening in the corn hopper 33, this chute being positioned directly to the rear of the shoe 25 and preferably integrally secured or bolted to the shoe. Consequently, when the planter is lowered by the lever at the driver's seat, each ground wheel 39 will contact the ground as indicated in Figure 1, and the wheel will be caused to turn due to the pull of the tractor, thus imparting power to the feeding mechanism of the corn hopper 33. The corn seed is therefore dropped in any predetermined manner through the chute 40, into the groove in the soil formed by the shoe or plow 25. The fertilizer hopper 41 is positioned to the rear of the corn hopper and is also carried on the auxiliary U-shaped frame 26, preferably by means of a four-legged pedestal 42 secured to opposite legs of the frame. The chute for the fertilizer hopper is indicated at 43, and the lower end of this chute terminates at a position slightly to the rear of the corn chute 40, as can be seen in Figures 1 and 2. It has been pointed out that each auxiliary frame 26 on which the corn and fertilzer hoppers are mounted is swivelly carried by the main frame members 16, 17 at the points 25' and plate 27. Consequently, each auxiliary frame 26 is adapted to swing with a vertical motion and independently of one another and also independently of the main frame 16, 17.

Now suppose that the planter is being drawn over bumpy or hilly ground and that the change in slope is abruptly encountered. Due to the tiltable operation of the auxiliary frames 26 the surfaces of the plow 25 and the wheel 39 which contact the ground will tend to adapt themselves automatically to the change in contour or slope of the ground. Each of the planter units which comprise, in the aggregate, the plow 25, the wheel 39, the corn hopper 33 and the fertilizer hopper 41, is adapted to tilt along a horizontal axis provided by the swivel joint 25' and the apertured plate 27, and in addition each unit is adapted to swing upwardly about the swivel 25' along a path determined by the rod 29 so that the planter unit has practically a universal movement which is independent of the movement of the other planter unit and to a great extent is independent of the movement of the main frame 16, 17. Due to the versatility of movement accorded each planter unit, the planter as a whole can conform itself to any irregularity or slope of ground and by properly setting the height of the planter by the lever at the driver's seat, the corn seed is inserted into the ground at a predetermined depth regardless of irregularities of ground surface. Moreover, by reason of the fact that the ground wheels 39 may automatically accommodate their positions to different slopes of the ground, a firm contact is assured between each wheel and the ground in order to provide a positive drive for the feeding and fertilizing mechanism. As shown in Figures 1 and 2, the feeding mechanism in the fertilizer hoppers 41 may be actuated through a chain drive 45 which engages a sprocket, journaled at 38 and rotatably connected to the wheel 39.

In order to mark the position of the next planting row a pair of scoring discs 46, positioned on opposite sides of the planter, may be employed. As shown in Figure 3, these discs are mounted on the end of a rod 47 which is connected to triangular frame members 48, 49, swivelled respectively in the ends of the main frame members 17, 23. Steel cables 50 are provided to hold one of the discs 46 and its frame in an upright position when the other disc is in contact with the ground. The excess length of these cables may, for convenience, be wound around the compression bar 4 as indicated at 51.

From the foregoing it is evident that I have disclosed a corn planter adapted to be drawn by a tractor and consisting of two independently operative units, each of which automatically conforms to the contour of the ground but both units being moved upwardly by a single actuating lever at the driver's seat when it is desired to remove the plow and ground wheel from the ground, as for example, when the planter is being conveyed from one row to the next across the end of a field. Any sudden movement of the lever does not cause the plow and ground wheel to be immediately withdrawn, and no movement is initiated at the planter elements until after the hook 30 has come into contact with the transversely extending angle from 17 of the main frame. Moreover, the planter units are flexibly supported on the main frame by the springs 32, the main frame serving merely to give a continuous yieldable urge downwardly due to its weight to the auxiliary frames which carry the planter units.

It will be understood that I desire to comprehend within my invention such modifications as come within the scope of the claims and the invention.

Having thus fully described my invention, what I claim as new and desire to secure by Letters Patent, is:

1. Seed planting mechanism comprising a main frame adapted to be drawn by a source of motive power, an auxiliary frame carrying a planter unit including a seed-feeding device, a plow shoe and a ground wheel, one end of said auxiliary frame being swivelly mounted on said main frame, and a rod positioned between the other end of said auxiliary frame and the main frame, said rod being swivelly connected to the auxiliary frame and adapted to slide through an opening in the main frame, said swivel connections extending in a direction parallel to the longitudinal axis of the main frame.

2. Seed planting mechanism comprising a main frame adapted to be drawn by a source of motive power, an auxiliary frame carrying a planter unit including a seed-feeding device, a plow shoe and a ground wheel, one end of said auxiliary frame being swivelly mounted on said main frame, a rod positioned between the other end of said auxiliary frame and the main frame, said rod being swivelly connected to the auxiliary frame and adapted to slide through an opening in the main frame, said swivel connections extending in a direction parallel to the longitudinal axis of the main frame, a collar on said rod, and a spring positioned between the collar and the adjacent surface of the main frame.

3. Seed planting apparatus comprising a main frame adapted to be drawn by a source of motive power and a plurality of auxiliary frames swivelly mounted on said main frame, said swivels of said auxiliary frames extending in a longitudinal axis relative to the source of power, each auxiliary frame carrying a complete planter unit, one end of each auxiliary frame being swivelly mounted on one end of said main frame and the other end of each of said auxiliary frames being suspended from the other end of the main frame by a rod which extends between the main frame and each auxiliary frame, said rod being adapted slidably to thread through an opening in the main frame and being provided with a hook portion at the upper surface of the main frame to prevent disengagement between the rod and the main frame.

JOHN F. RUDE.